L. R. FAUGHT.
Improvement in Hold Fasts for Lathe Spindles.
No. 115,290.    Patented May 30, 1871.
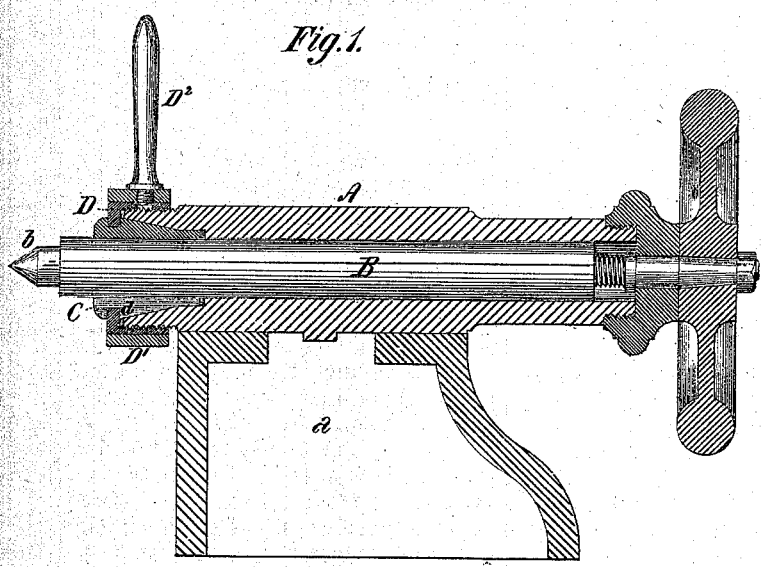
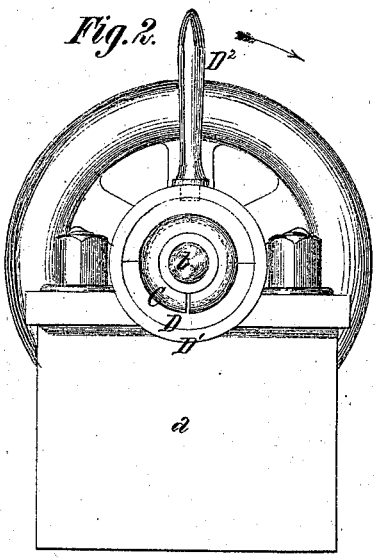
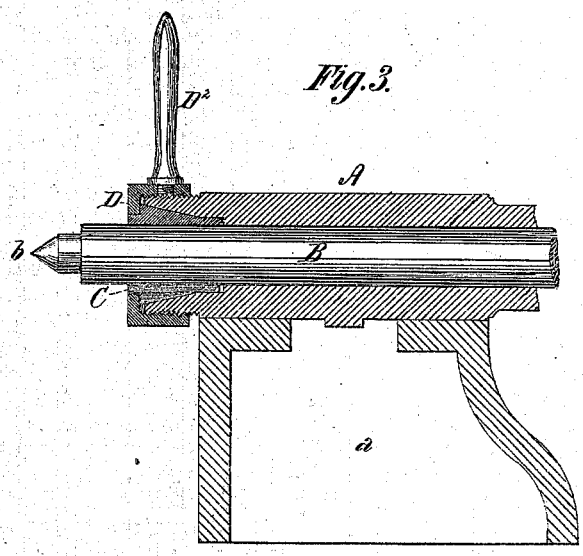
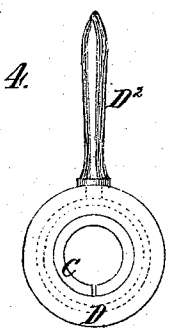

UNITED STATES PATENT OFFICE.

LUTHER R. FAUGHT, OF PHILADELPHIA, PENNSYLVANIA.

IMPROVEMENT IN HOLD-FASTS FOR LATHE-SPINDLES.

Specification forming part of Letters Patent No. 115,290, dated May 30, 1871.

*To all whom it may concern:*

Be it known that I, LUTHER R. FAUGHT, of the city and county of Philadelphia, in the State of Pennsylvania, have invented a certain new and useful Improvement in Hold-Fasts for Lathe-Spindles, of which the following is a specification:

The object of my invention is to provide a simple and efficient device for tightening lathe-spindles in their stocks, in the use of which the spindle shall be held firmly fast or readily released, as required; the central position of the spindle shall be constantly maintained and freed from interference caused by its wear and the wear of the stock; the spindle shall be solidly held at a point nearer to its end than is practicable by the ordinary methods; and that ample provision shall be made for taking up the wear of the spindle and stock without reboring or bushing. To these ends my improvement consists in the combination, with a lathe-spindle, of a split conical sleeve fitting thereon, and an adjusting-nut which operates the conical sleeve and works upon a screw on the outside of the socket of the spindle and at the end adjacent to the point of the spindle.

In the accompanying drawing, Figure 1 is a longitudinal central section through a lathe-stock embracing my improvements; Fig. 2, an elevation of the front end of the same; Fig. 3, a longitudinal central section through a lathe-stock, showing a modified form of my improvement; and Fig. 4, an end elevation of the nut and sleeve of the same.

The stock or socket A is suitably secured to a standard, $a$, and bored out to receive the stationary lathe-spindle B, which fits accurately within it and is moved longitudinally toward or from the live spindle of the lathe, as from time to time required, by a screw tapped into it, and operated by a hand-wheel in the ordinary manner. At the end adjacent to the point or center $b$ of the spindle the socket A is bored out to receive a split conical sleeve, C, which is slipped on the spindle, and on its outer surface is turned to fit accurately within the recess thus formed in the socket, and has its inner surface bored out to fit with like accuracy upon the spindle B.

From this construction it is evident that in proportion as the conical sleeve is drawn into the recess in the socket, which is effected by means presently to be described, it will close upon the spindle B and clamp it tightly in the socket, without having any tendency to interfere with its axial position therein, as is the case with the set-screws employed for a similar purpose.

In the drawing I have shown two methods of operating the sleeve C, the one, Figs. 1 and 2, being capable of both tightening and slackening its bearing upon the spindle, and the other, Figs. 3 and 4, being only available for tightening. When this latter construction, therefore, is adopted, means must be provided for protruding the sleeve from the stock, which means will readily suggest themselves to a skillful mechanic. Referring to Figs. 1 and 2, a nut, D, is shown, which is formed in two parts, so that its inwardly-projecting flange $d$ may be slipped into an annular groove on the periphery of the conical sleeve C, near its larger end. A band, $D^1$, slipped over the section, unites them, and is held in position by a bolt or key. In this instance the handle $D^2$, by which the nut is turned, is tapped through the band into one of the sections, and thereby serves to unite them. The nut D works upon a screw cut upon the outside of the socket A, and when turned in the direction of the arrow, Fig. 2, draws the sleeve C into its recess in the socket and clamps the spindle firmly in position. When turned in the opposite direction it withdraws the sleeve, and the spindle is then free to be moved in the socket, as required.

In the arrangement shown in Figs. 3 and 4 the nut is formed in a single piece, and instead of entering a groove in the sleeve merely bears against a shoulder thereon. It is plain, therefore, that while it will tighten the bearing of the sleeve upon the spindle, as in the preceding case, it does not afford means of withdrawing the sleeve from the recess, and will not, therefore, release the spindle. For this reason I prefer the construction shown in Figs. 1 and 2.

It will be perceived, by the construction and arrangement herein shown and described, that the operative mechanism is located very near the point or center of the spindle, and the clamping force exerted correspondingly near to this point, at which the greatest strain of the work of the lathe comes upon the spindle, and, as hereinbefore explained, the operation of the device maintains the spindle in its central position, insuring corresponding accuracy in the work and reducing correspondingly the wear of the parts and the difficulty and expense of repairs.

I do not broadly claim clamping a lathe-spindle in its socket by a conical sleeve, however constructed or operated, as I already have a patent on one way of doing this; but

What I claim as new, and desire to secure by Letters Patent, is—

The combination, with the spindle, of the externally-screwed socket, the split conical clamping-sleeve, the adjusting-nut working in a groove in the sleeve and over the screwed socket, and the clamping-band or its equivalent, substantially as set forth.

L. R. FAUGHT.

Witnesses:
 GEO. H. KIRK,
 JOHN H. REDFIELD.